(12) United States Patent
Shim et al.

(10) Patent No.: US 8,117,543 B2
(45) Date of Patent: Feb. 14, 2012

(54) METHOD FOR PROVIDING GUI TO DISPLAY A PLURALITY OF LISTS AND MULTIMEDIA APPARATUS USING THE SAME

(75) Inventors: Jung-hyun Shim, Seongnam-si (KR); Nho-kyung Hong, Seoul (KR); Hyun-ki Kim, Seoul (KR); Eun-kyung Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 789 days.

(21) Appl. No.: 12/172,510

(22) Filed: Jul. 14, 2008

(65) Prior Publication Data

US 2009/0183076 A1 Jul. 16, 2009

(30) Foreign Application Priority Data

Jan. 16, 2008 (KR) ........................ 10-2008-0005010

(51) Int. Cl.
*G06F 3/00* (2006.01)
(52) U.S. Cl. ........................................ 715/716; 715/718
(58) Field of Classification Search .................. 715/716, 715/718
See application file for complete search history.

(56) References Cited

U.S. PATENT DOCUMENTS

| | | | | |
|---|---|---|---|---|
| 5,463,727 A * | 10/1995 | Wiggins et al. | ............... | 715/841 |
| 5,485,175 A * | 1/1996 | Suzuki | ............... | 715/841 |
| 5,559,945 A * | 9/1996 | Beaudet et al. | ............... | 715/841 |
| 5,655,094 A * | 8/1997 | Cline et al. | ............... | 715/786 |
| 6,248,946 B1 * | 6/2001 | Dwek | ............... | 84/609 |
| 6,384,850 B1 * | 5/2002 | McNally et al. | ............... | 715/810 |
| 7,590,946 B2 * | 9/2009 | Okamura | ............... | 715/786 |
| 2002/0073108 A1 * | 6/2002 | Morita et al. | ............... | 707/201 |
| 2004/0078382 A1 * | 4/2004 | Mercer et al. | ............... | 707/102 |
| 2004/0100504 A1 * | 5/2004 | Sommer | ............... | 345/810 |
| 2004/0261040 A1 * | 12/2004 | Radcliffe et al. | ............... | 715/840 |
| 2005/0096812 A1 * | 5/2005 | Nezu et al. | ............... | 701/36 |
| 2006/0184896 A1 * | 8/2006 | Foucher et al. | ............... | 715/810 |
| 2007/0168369 A1 * | 7/2007 | Bruns | ............... | 707/100 |

* cited by examiner

*Primary Examiner* — William Bashore
*Assistant Examiner* — Gregory A Distefano
(74) *Attorney, Agent, or Firm* — Jefferson IP Law, LLP

(57) ABSTRACT

A method of providing a graphical user interface (GUI) and a multimedia apparatus using the same are provided, the method including: dividing a list display area into a plurality of sub-areas; and displaying a plurality of related lists regarding the multimedia content on the plurality of sub-areas, respectively. Accordingly, a plurality of related lists are displayed on a plurality of divided areas, and the scroll directions of the lists are independently decided according to each area. Therefore, a user can find desired content with greater convenience.

40 Claims, 16 Drawing Sheets

METHOD FOR PROVIDING GUI TO DISPLAY A PLURALITY OF LISTS AND MULTIMEDIA APPARATUS USING THE SAME

CROSS-REFERENCE TO RELATED APPLICATION

This application claims all benefits accruing under 35 U.S.C. §119 from Korean Application No. 2008-5010, filed on Jan. 16, 2008, in the Korean Intellectual Property Office, the disclosure of which is incorporated herein by reference.

BACKGROUND OF THE INVENTION

1. Field of the Invention

Aspects of the present invention relate to a method of providing a graphical user interface (GUI) and a multimedia apparatus using the same, and more particularly, to a method of providing a GUI for display lists of content and a multimedia apparatus using the same.

2. Description of the Related Art

Multimedia apparatuses (such as MP3 players and portable multimedia players (PMP)) have become widely used, and as a result, user-friendly features have been developed to be provided thereon. For example, displays on which graphical user interfaces (GUIs) have been developed for multimedia apparatuses. Commonly used GUIs have icons and/or menus that are displayed on the displays and selected using pointers. In such a GUI, the user can select and use desired content using an input unit (such as a mouse or a touch screen) to input user commands.

Due to advances in technology, the storage capacity of multimedia apparatuses has steadily increased. As a result, the content that can be stored in such multimedia apparatus has increased in size and variety. Accordingly, methods for classifying and systematically storing such content are also diverse and complicated. That is, the larger and more diverse content stored in the multimedia apparatus becomes, the more complicated and difficult it is to search for desired content. Therefore, there is a need for methods by which the user may search for desired content with greater convenience.

SUMMARY OF THE INVENTION

Several aspects and example embodiments of the present invention provide a method of providing a graphical user interface (GUI) to display a plurality of lists in a plurality of divided areas so that a user can search for desired content with greater convenience, and a multimedia apparatus using the same.

Additional aspects and/or advantages of the invention will be set forth in part in the description which follows and, in part, will be obvious from the description, or may be learned by practice of the invention.

In accordance with an example embodiment of the present invention, there is provided a method of providing a GUI to manage and/or reproduce multimedia content, the method including: dividing a list display area into a plurality of sub-areas; and displaying a plurality of related lists regarding the multimedia content on the plurality of sub-areas, respectively.

According to an aspect of the present invention, the displaying of the plurality of related lists may include: display a first list on a first sub-area of the plurality of sub-areas; and if an item included on the first list is selected, displaying a second list associated with the selected item on a second sub-area of the plurality of sub-areas.

According to an aspect of the present invention, the plurality of related lists may have a hierarchical relationship with each other.

According to an aspect of the present invention, the displaying of the plurality of related lists may include: displaying a first list on a first sub-area of the plurality of sub-areas; and displaying a second list on a second sub-area of the plurality of sub-areas, the second list being hierarchically lower than the first list.

According to an aspect of the present invention, the plurality of related lists on the plurality of sub-areas may be displayed in different display forms.

According to an aspect of the present invention, the method may further include independently deciding a navigation direction of each related list according to each respective sub-area.

According to an aspect of the present invention, the deciding of the navigation direction may include independently deciding the navigation direction of each related list based on a ratio of a horizontal length to a vertical length of each respective sub-area and/or based on a displaying form of each list.

According to an aspect of the present invention, the navigation direction may include a scroll direction.

According to an aspect of the present invention, the method may further include changing a position of a border line between the plurality of sub-areas according to a manipulation of a user.

According to an aspect of the present invention, the method may further include changing a list display mode between a first mode, in which the plurality of related lists are displayed on the plurality of divided sub-areas, and a second mode, in which a first list of the plurality of related lists is displayed on an entire list display area, according to a manipulation of a user.

According to an aspect of the present invention, the changing of the list display mode may include, when the list display mode changes from the second mode to the first mode, firstly displaying a list that is lastly displayed in the second mode in the first mode in a first sub-area from among the plurality of sub-areas.

According to an aspect of the present invention, the plurality of lists may include a list regarding content, a list regarding categories, and/or a list regarding function menus.

In accordance with another example embodiment of the present invention, there is provided a multimedia apparatus to manage and/or reproduce multimedia content, the multimedia apparatus including: a generation unit to generate a graphical user interface (GUI); and a control unit to control the generation unit to divide a list display area into a plurality of sub-areas and to generate the GUI such that a plurality of related lists regarding the multimedia content are displayed on the plurality of sub-areas, respectively.

According to an aspect of the present invention, the control unit may display a first list on a first sub-area of the plurality of sub-areas, and if an item included on the first list is selected, a second list associated with the selected item on a second sub-area of the plurality of sub-areas.

According to an aspect of the present invention, the plurality of lists may have a hierarchical relationship with each other.

According to an aspect of the present invention, the control unit may display a first list on a first sub-area of the plurality of sub-areas, and may display second list that is associated with an item included on first certain list on a second sub-area of the plurality of sub-areas.

According to an aspect of the present invention, the control unit may display the plurality of related lists on the plurality of sub-areas in different display forms.

According to an aspect of the present invention, the control unit may independently decide a navigation direction of the plurality of related lists on the plurality of sub-areas according to each sub-area.

According to an aspect of the present invention, the control unit may independently decide the navigation direction of the plurality of related lists on the plurality of sub-areas according to each sub-area, based on a ratio of a horizontal length to a vertical length of each sub-area and/or based on a displaying form of each list.

According to an aspect of the present invention, the navigation direction may include a scroll direction.

According to an aspect of the present invention, the control unit may change a position of a border line between the plurality of sub-areas according to a manipulation of a user.

According to an aspect of the present invention, the control unit may change a list display mode between a first mode, in which the plurality of related lists are displayed on the plurality of divided sub-areas, and a second mode, in which a first list is displayed on the entire list display area, according to a manipulation of the user.

According to an aspect of the present invention, when the list display mode changes from the second mode to the first mode, the control unit may firstly display a list, which has been lastly displayed in the second mode, in the first mode in a first sub-area from among the plurality of sub-areas.

According to an aspect of the present invention, the plurality of lists may include a list regarding content, a list regarding categories, and/or a list regarding function menus.

In accordance with yet another example embodiment of the present invention, there is provided a method of providing a GUI, the method including: dividing a list display area into a first area and a second area; and displaying a first list on the first area; and displaying a second list, which is a hierarchically lower list associated with an item included on the first list, on the second area.

According to an aspect of the present invention, the method may further include if a user selects an item included on the second list, displaying a third list, which is a hierarchically lower list associated with the selected item, on the first area.

According to an aspect of the present invention, the method may further include displaying a fourth list, which is a hierarchically lower list associated with an item included on the third list, on the second area.

In accordance with still another example embodiment of the present invention, there is provided a method of providing a GUI, the method including: dividing a list display area into a first area and a second area; displaying a first list on the first area and a second list on the second area, respectively; and independently deciding a direction for scrolling the first and second lists displayed on the first area and the second area, respectively, according to each area.

In accordance with another example embodiment of the present invention, there is provided a method of providing a GUI, the method including: dividing a list display area into a first area and a second area; and displaying a first list on the first area, and displaying a second list having a display form that is different from a display form of the first list on the second area.

In accordance with yet another example embodiment of the present invention, there is provided a method of providing a graphical user interface (GUI) to manage and/or reproduce multimedia content, the method including: receiving an input for a first display mode or a second display mode; in the first display mode, dividing a list display area into a plurality of sub-areas, and displaying a plurality of related lists regarding the multimedia content on the plurality of sub-areas, respectively; and in the second display mode, displaying a first list of the plurality of related lists on an entirety of the list display area.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
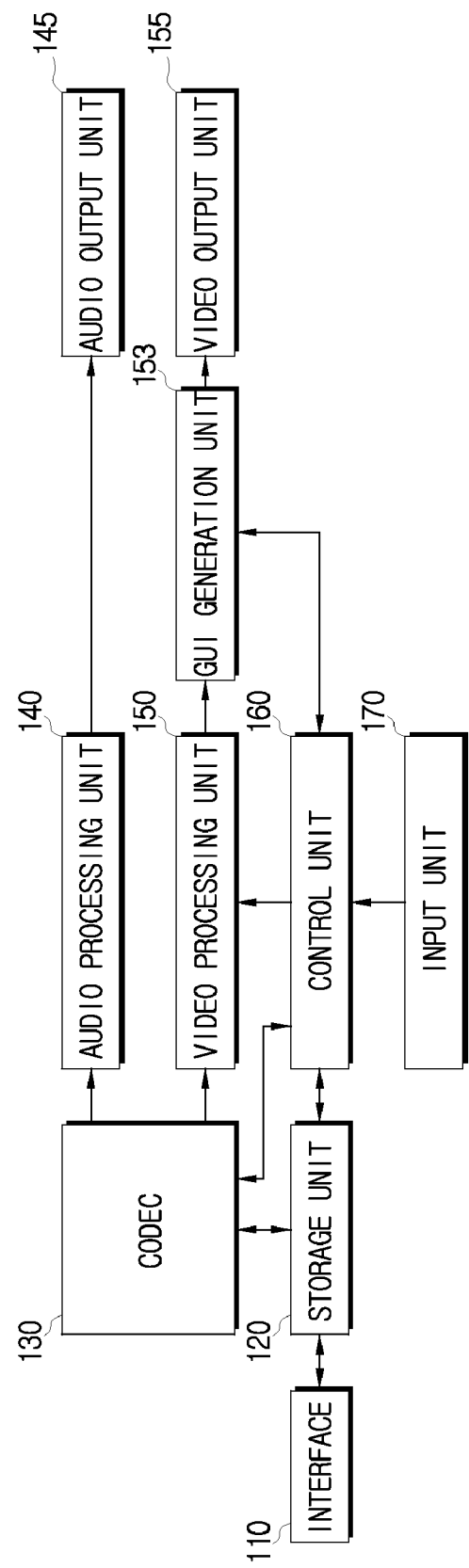
FIG. 1 is a schematic block diagram of an MP3 player according to an example embodiment of the present invention.

Reference will now be made in detail to the present embodiments of the present invention, examples of which are illustrated in the accompanying drawings, wherein like reference numerals refer to the like elements throughout. The example embodiments are described below in order to explain the present invention by referring to the figures.

FIG. 1 is a schematic block diagram of an MP3 player according to an example embodiment of the present invention. It is understood that the MP3 player is provided as an example, and aspects of the present invention are not limited thereto. That is, aspects of the present invention are applicable to any multimedia reproducing or management apparatus. Referring to FIG. 1, the MP3 player includes an interface 110, a storage unit 120, a codec 130, an audio processing unit 140, an audio output unit 145, a video processing unit 150, a graphical user interface (GUI) generation unit 153, a video output unit 155, a control unit 160, and an input unit 170.

The interface unit 110 connects the MP3 player to a content storage device (such as a computer). The MP3 player downloads multimedia files from the content storage device through the interface 110, and uploads multimedia files to the content storage device through the interface 110. The storage unit 120 stores multimedia files (such as music files, video files, and text files), and an operation program to operate the MP3 player.

The codec 130 compresses or decompresses multimedia files. In detail, the codec 130 decompresses a multimedia file stored in the storage unit 120, transmits audio data of the decompressed multimedia file to the audio processing unit 140, and transmits video data of the decompressed multimedia file to the video processing unit 150. The audio processing unit 140 processes an audio signal received from the codec 130. For example, the audio processing unit 140 performs sound processing, noise removal, and equalization. Subsequently, the audio processing unit 140 outputs the processed audio data to the audio output unit 145. The audio output unit 145 outputs the audio data to a speaker or an external device (such as an ear phone or a headset) that is connected through an external output terminal. The video processing unit 150 processes a video signal received from the codec 130. For example, the video processing unit 150 performs video scaling, and subsequently outputs the processed video data to the GUI generation unit 153.

The GUI generation unit 153 generates a GUI to be displayed on the display, and adds the GUI to the video data output from the video processing unit 150. The video output unit 155 displays the GUI-added video output from the GUI generation unit 153 on the display, or outputs the GUI-added video to an external device connected through an external output terminal.

The input unit 170 receives user commands and transmits the user commands to the control unit 160. The input unit 170 may be implemented as key buttons, a wheel, a touch pad, or a touch screen.

The control unit 160 determines the user commands received from the input unit 170, and controls the overall operation of the MP3 player according to the user commands. In particular, the control unit 160 operates the GUI generation unit 153 to generate a GUI in which a list display area is divided into a plurality of areas, related lists are displayed on the areas, and a scroll direction of lists varies according to the plurality of areas. The related lists are a plurality of lists that are displayed on the plurality of areas and have higher and lower relationships therebetween. The plurality of lists may be a list regarding content, a list regarding categories, and/or a list regarding function menus.

The list regarding content is a list of content files stored in the storage unit 120. The list regarding content may express the title of content files as the list. For example, the list regarding music files includes "song 1," "song 2," "song 3," "song 4," etc. The list regarding categories is a list of categories of the content files. In general, categories may be formed based on the title of a folder including content files and/or metadata of content files. For example, the list regarding categories includes "artist 1," "artist 2," "artist 3," "artist 4," etc. The list regarding function menus is a list of menus regarding functions of the MP3 player. For example, the list regarding function menus includes "back," "play," "volume up," "volume down," etc.

The control unit 160 controls the plurality of lists to be displayed in respective different manners. For example, a certain list can be arranged as text in an area, and another list can be arranged as icons in another area. Furthermore, the control unit 160 independently decides a scroll direction of each list based on a ratio of a horizontal length to a vertical length of each area or the manner that each list is displayed. For example, if a horizontal length of a certain area is longer than a vertical length, the control unit 160 may provide the list to be horizontally scrolled. Alternatively, if a vertical length of a certain area is longer than a horizontal length, the control unit 160 may provide the list to be vertically scrolled. In addition, if a list is expressed in text and vertically arranged, the control unit 160 may provide the list to be vertically scrolled. Furthermore, if a list is expressed in icons and arranged in a matrix form, the control unit 160 may provide the list to be horizontally scrolled.

As another example, if the user inputs a mode change command through the input unit 170, the control unit 160 changes a list display mode of the MP3 player between a divided screen mode and a whole screen mode. In the divided screen mode, each of the lists is displayed on a respective area from among a plurality of divided areas. In the whole screen mode, a certain list is displayed on the entire display area. Furthermore, if the MP3 player is changed from the whole screen mode to the divided screen mode, the control unit 160 may firstly display an area for the list that was displayed in the whole screen mode, and then displays other areas. Accordingly, the user can intuitively recognize where the list displayed in the whole screen mode is displayed in the divided screen mode. However, it is understood that aspects of the present invention are not limited to this display method. For example, according to other aspects, the control unit may concurrently display the plurality of divided areas, and/or highlight or otherwise distinguish the area corresponding to the list that was displayed in the whole screen mode.

Figure 2:
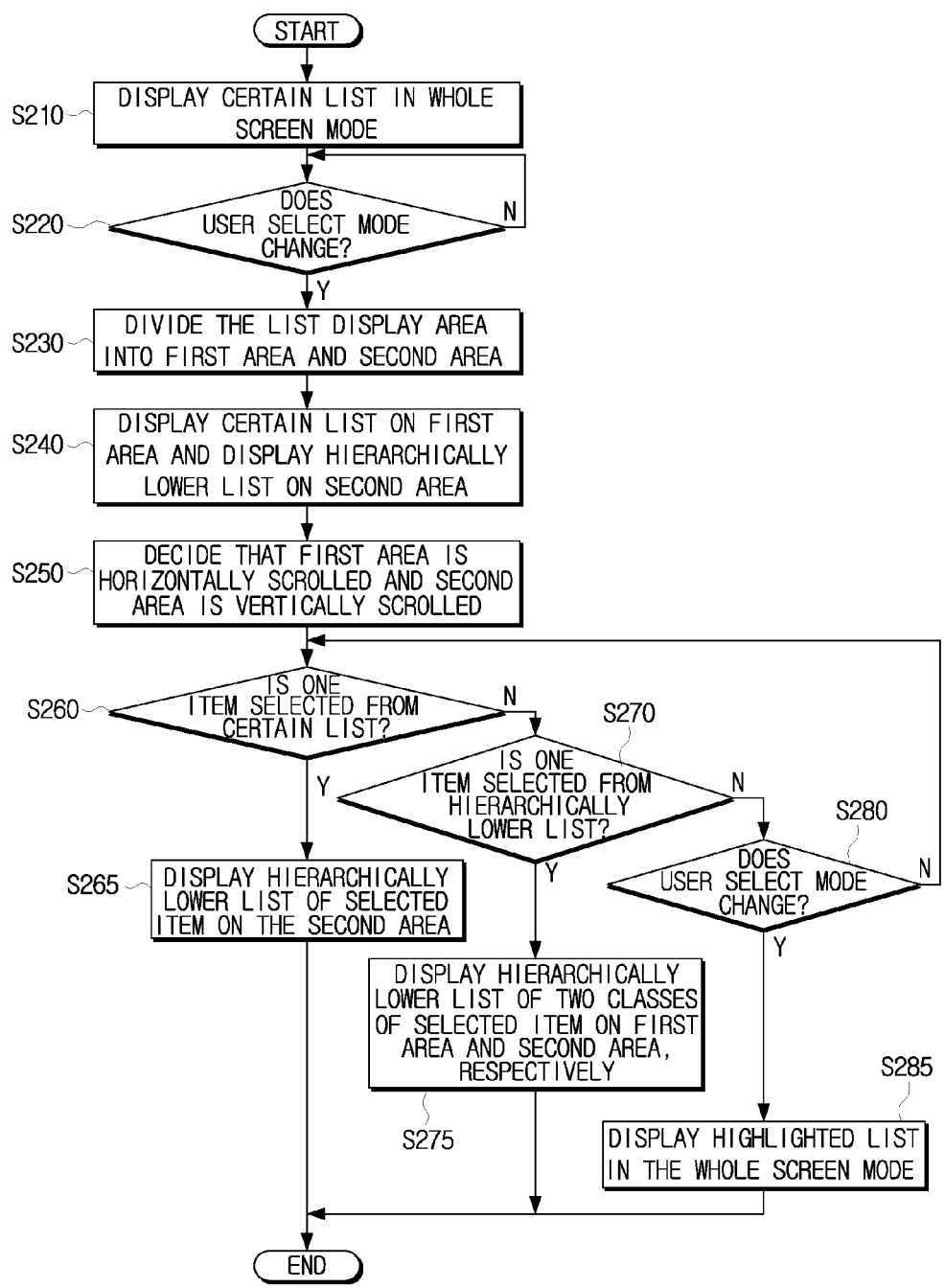
FIG. 2 is a flowchart of a GUI providing method according to an example embodiment of the present invention.

Hereinafter, the function of the control unit 160 is described in greater detail with reference to FIG. 2. FIG. 2 is a flowchart of a GUI providing method according to an example embodiment of the present invention. Referring to FIG. 2, the control unit 160 displays a certain list in the whole screen mode in operation S210. The certain list is a current list that is displayed on a list display area of the display.

If the user selects a mode change using the input unit 170 (operation S220-Y), the control unit 160 changes a list display mode from the whole screen mode to the divided screen mode in operation S230. That is, the control unit 160 divides the list display area into a first area and a second area.

The control unit 160 displays the certain list on the first area and displays a hierarchically lower list on the second area in operation S240. The hierarchically lower list is a list that belongs to one of the items in the certain list. For example, if the certain list is a list regarding "artist," and if "artist" includes items "artist 1," "artist 2," "artist 3," and "artist 4," the hierarchically lower list may be a list regarding "artist 2" and include the albums belonging to "artist 2." That is, the items of the hierarchically lower list may include "album 1," "album 2," "album 3," etc.

As an example, the control unit 160 controls the certain list on the first area to be displayed in the form of icons and be arranged in the form of a matrix, and controls the hierarchically lower list on the second area to be displayed in the form of text and be vertically arranged. Accordingly, the control unit 160 decides that the first area is horizontally scrolled and the second area is vertically scrolled in operation S250. Following operations S210 through S250, the control unit 160 changes the list display mode from the whole screen mode to the divided screen mode.

Figure 3:
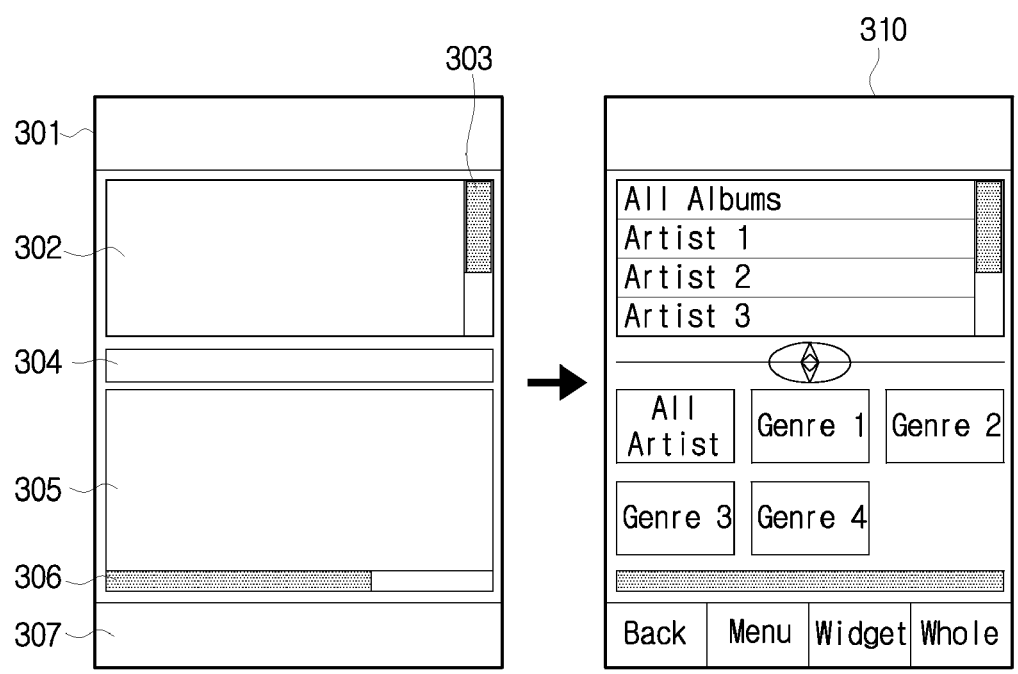
FIG. 3 illustrates a display area of a GUI and functions of each of the divided areas according to an example embodiment of the present invention.

The configuration of the display in the divided screen mode is described in greater detail with reference to FIG. 3. FIG. 3 illustrates a display area of a GUI and functions of each of the divided areas according to an example embodiment of the present invention. Referring to FIG. 3, the display screen of the multimedia reproducing or management apparatus includes an information display area 301, a second area 302, a second scroll bar 303, a border line 304, a first area 305, a first scroll bar 306, and a tool bar 307.

The information display area 301 displays simple information on a currently displayed screen. For example, if a current screen relates to listening to music, "music" is displayed. Similarly, if a current screen relates to viewing a movie, "movie" is displayed. The second area 302 displays a hierarchically lower list as described above. The hierarchically lower list displays a list that belongs to one of the items in a certain list displayed on the first area 305. The second scroll bar 303 scrolls the list displayed on the second area 302. The border line 304 displays a border between the second area 302 and the first area 305, and may be moved by manipulation of the user.

The first area 305 displays a certain list as described above. The first scroll bar 306 scrolls the certain list displayed on the first area. The tool bar 307 displays menus to perform diverse functions. For example, as shown in an example screen 310, the tool bar 307 displays buttons "back," "menu," "widget," and "whole." The "whole" button is a button that changes the list display mode from the divided screen mode to the whole screen mode.

The example screen 310 shows how a list display screen is actually displayed in the divided screen mode. In the example screen 310, the first area 305 displays a list of genres including "genre 1" through "genre 4", and the second area 302 displays a list of artists including "artist 1" to "artist 3." In general, since a certain genre includes many artists, the list of genres on the first area 305 is a hierarchically higher list than the list of artists on the second area 302. Furthermore, since the first scroll bar 306 is horizontally provided and the second scroll bar 303 is vertically provided, the scroll directions on the first area 305 and the second area 302 are different. Accordingly, a GUI in which the list display area is divided as in FIG. 3 is displayed.

As described above, the first area 305 and the second area 302 display their respective lists in different manners, so the list displayed on the first area 305 and the list displayed on the second area 302 can be distinctively provided. For example, if both the first area 305 and the second area 302 are displayed in the form of text and vertically arranged, it is difficult for the user to distinguish the first area 305 from the second area 302. However, if the first area 305 and the second area 302 are displayed in different manners, the user can recognize the different lists with greater ease.

Moreover, the user can scroll a desired list more easily by differentiating the scroll direction on the first area 305 and the second area 302. For example, if both the first area 305 and the second area 302 are vertically scrolled, when the user vertically scrolls on, for example, a touch screen to scroll the first area 305, there is a possibility that the list on the second area 302 may be scrolled. However, if the scroll direction of the first area 305 and the second area 302 are different, such a malfunctioning can be prevented.

Though the example embodiment described with reference to FIG. 3 provides a hierarchically lower list above a hierarchically higher list, it is understood that aspects of the present invention are not limited thereto. For example, the hierarchically lower list may be provided below or to a side of the hierarchically higher list, or two displayed lists may not have a hierarchical relation.

Figure 4:
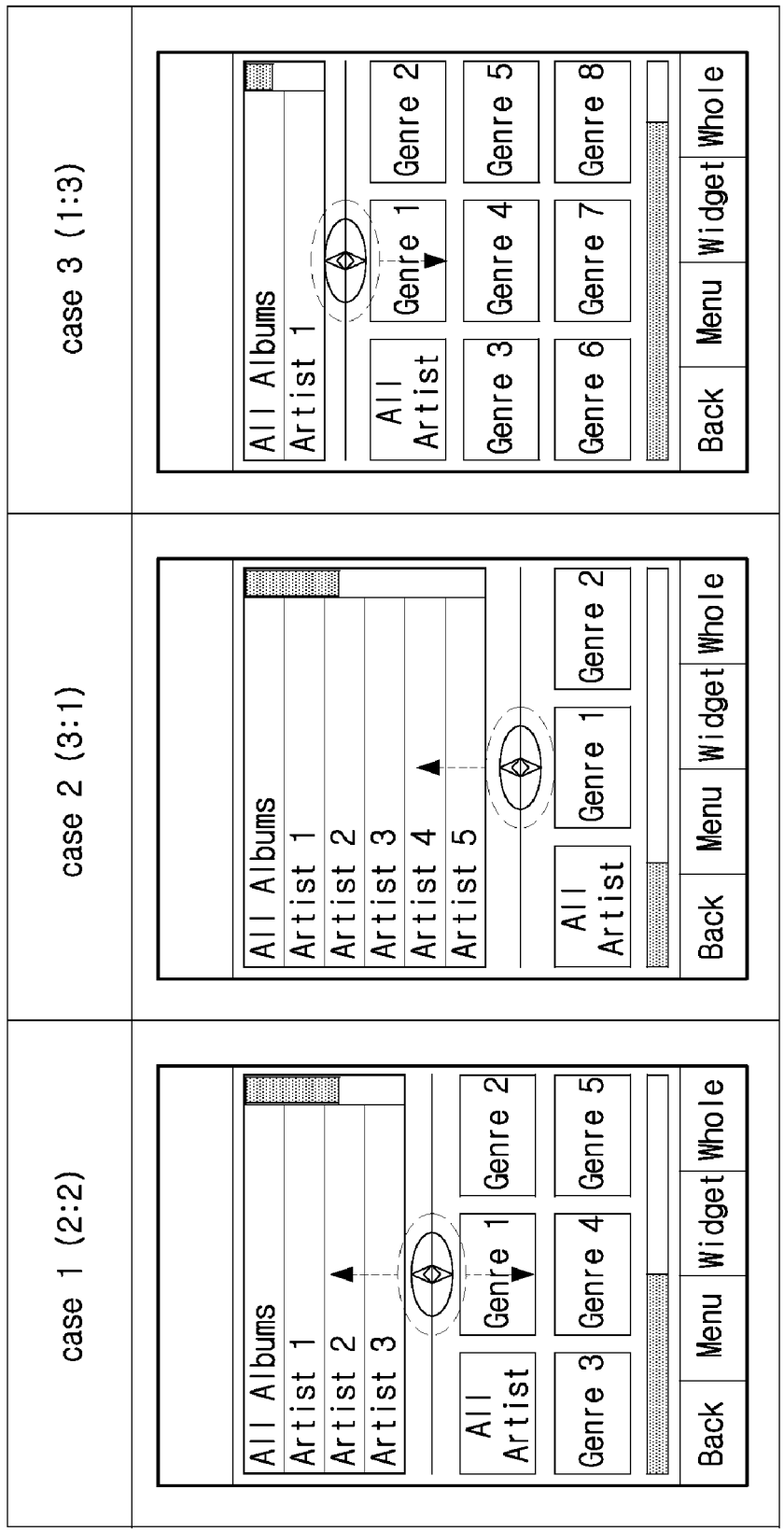
FIG. 4 illustrates a method of changing a position of a border line according to an example embodiment of the present invention.

Hereinafter, a method of changing a position of the border line is described with reference to FIG. 4. FIG. 4 illustrates a method of changing the position of the border line according to an example embodiment of the present invention. Specifically, FIG. 4 illustrates cases where the ratio of the second area to the first area is 2:2, 3:1, and 1:3. If the display of the multimedia reproducing or management apparatus is implemented as a touch screen, the user can change the position of the border line 304 by a simple touching. Therefore, the user can more conveniently use the multimedia reproducing or management apparatus by more easily adjusting a desired area.

Referring back to FIG. 2, in the divided screen mode, if the user selects one item from the list on the first area (operation S260-Y), the control unit 160 displays a hierarchically lower list of the selected item on the second area in operation S265. For example, in the example screen 310 of FIG. 3, if the user selects "genre 2" displayed on the first area, "genre 2" is highlighted and the artists "artist 1," "artist 2," and "artist 3" corresponding to "genre 2" are displayed on the second area. If the user selects one item from the hierarchically lower list on the second area (operation S270-Y), the control unit 160 displays a hierarchically lower list of two classes of the selected item on the first area and the second area, respectively in operation S275. This will be described below in greater detail with reference to FIG. 6. Furthermore, if the user selects a mode change using the input unit 170 (operation S280-Y), the control unit 160 displays a highlighted list from among the first area and the second area in the whole screen mode in operation S285. Following this process, the control unit 160 provides a GUI displaying the lists in the divided screen mode.

Figure 5:
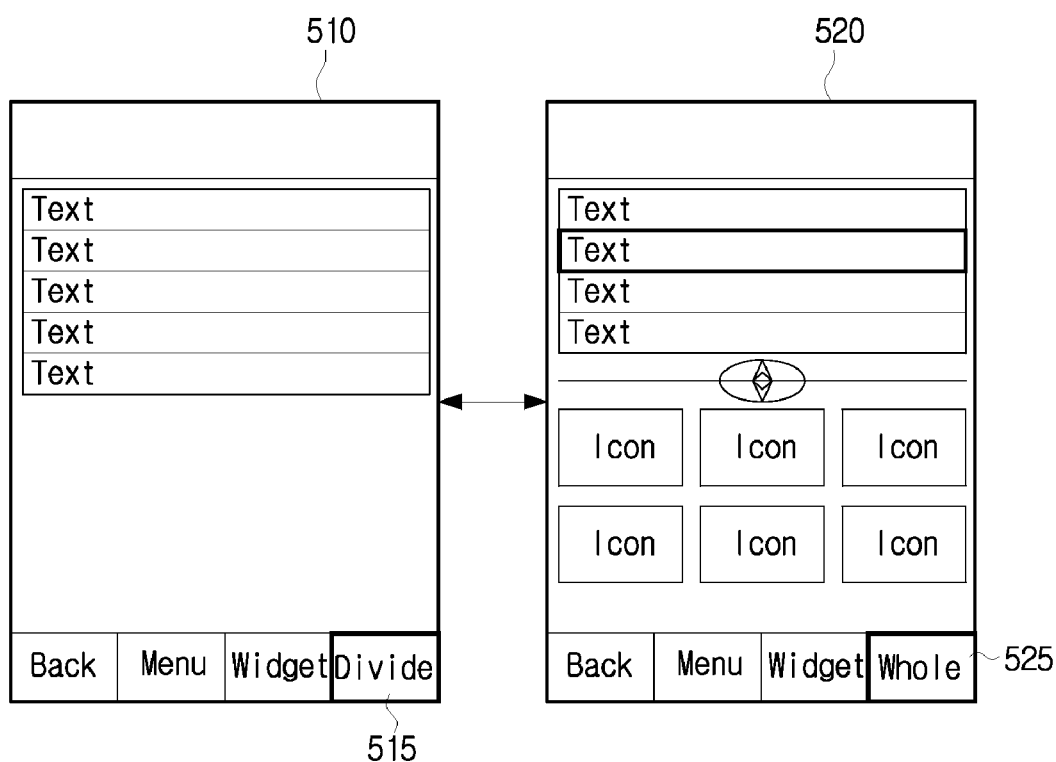
FIG. 5 illustrates screens on which a list display mode is changed according to an example embodiment of the present invention.

Hereinafter, the process of changing the list display mode is described in more detail with reference to FIGS. 5 and 6. As an example, the display of the MP3 is implemented as a touch screen, though it is understood that aspects of the present invention are not limited thereto. For example, separate input keys or devices may be implemented as an input unit. FIG. 5 illustrates screens on which a list display mode is changed according to an example embodiment of the present invention. Referring to FIG. 5, a screen 510 in the whole screen mode displays a divide button 515 as a mode change button on a tool bar. In addition, a screen 520 in the divided screen mode displays a whole button 525 as a mode change button on the tool bar. If the user touches the divide button 515 on the whole screen 510, the control unit 160 changes the screen from the whole screen 510 to the divided screen 520. In addition, if the user touches the whole button 525 on the divided screen 520, the control unit 160 changes the screen from the divided screen 520 to the whole screen 510.

Moreover, one item from a list of texts on the second area is highlighted on the divided screen 520, so if the screen changes to the whole screen 510, the list of texts that is displayed on the second area of the divided screen 520 is displayed on the whole screen 510. That is, if the divided screen mode changes to the whole screen mode, a list that is activated by the user selecting from among the first area and the second area is displayed on the whole screen 510

Hereinafter, the mode change process is described in greater detail with reference to FIG. 6, which illustrates a process of sequentially displaying lists according to an example embodiment of the present invention. FIG. 6 illustrates five example screens 610 to 650 in the whole screen mode, and two example screens 660 to 670 in the divided screen mode. A first whole screen 610 is shown as an initial screen to play back music in the MP3 player or a multimedia reproducing or management apparatus. If the user touches "genres" from the list displayed on the first whole screen 610, a second whole screen 620 including a list of genres is displayed. If the user touches "genre 2" from the list of genres displayed on the second whole screen 620, a third whole screen 630 including a list of artists belonging to "genre 2" is displayed. If the user touches "artist 1" from the list of artists displayed on the third whole screen 630, a fourth whole screen 640 including a list of albums belonging to "artist 1" is displayed. If the user touches "album 1" from the list of albums displayed on the fourth whole screen 640, a fifth whole screen 650 including a list of songs belonging to "album 1" is displayed. As described above, in the whole screen mode, the user selects a desired song through the screens 610 to 650 in five steps.

In the divided screen mode, however, if the user touches "genres" on the first whole screen 610, a first divided screen 660 is displayed. If the user touches "genre 2" on a first area of the first whole screen 610, a list of artists are displayed on a second area of the first whole screen 610. If the user touches "artist 1" on the second area of the first whole screen 610, a list of albums and a list of songs, which are hierarchically lower lists of two classes belonging to "artist 1", are displayed on the first area and the second area, respectively, of a second divided screen 670. That is, in the divided screen mode, if one item is selected from the list on the second area, hierarchically lower lists of two classes of the selected item are displayed on the first area and the second area, respectively. Therefore, in the divided screen mode, the user selects a desired song through the screens 610, 660, and 670 in three steps.

As described above, the number of screens used to select a desired song in the divided screen mode is lower than the number of screens used to select the desired song in the whole screen mode. Accordingly, in the divided screen mode, the user can find a desired song with greater ease and convenience.

Furthermore, the user can change the list display mode between the whole screen mode and the divided screen mode by touching the "divide" button or the "whole" button. For example, when the first divided screen 660 is displayed and the first area displaying the list of genres is activated (for example, an item in the list of genres is highlighted), the screen 660 changes to the second whole screen 620 displaying the list of genres if the user touches the "whole" button. When the first divided screen 660 is displayed and the second area displaying the list of artists is activated, the screen 620 changes to the third whole screen 630 displaying the list of artists if the user touches the "whole" button. If the user touches the "divide" button from the second whole screen 620 or the third whole screen 630, the screen changes to the first divided screen 660. Following the process described above, the user can display and switch between lists in both the whole screen mode and the divided screen mode.

Hereinafter, graphical effects occurring when the list display mode is changed are described in more detail with reference to FIGS. 7 to 16. FIG. 7 illustrates graphical effects when the second whole screen 620 in FIG. 6 changes the first divided screen 660 in FIG. 6 according to an example embodiment of the present invention. Referring to FIG. 7, when the whole screen mode changes to the divided screen mode, the screen changes in the following order: the second whole screen 620→screen 710→screen 720→screen 730→screen 740→the first divided screen 660. In the divided screen 730, a list of genres on the first area is firstly displayed. The list of genres is the list displayed on the first whole screen 620. That is, as described above, when the whole screen mode changes to the divided screen mode, the list that has been displayed in the whole screen mode is firstly displayed in the divided screen mode, so the user can intuitively recognize where the list that was displayed in the whole screen mode is displayed in the divided screen mode.

Figure 6:
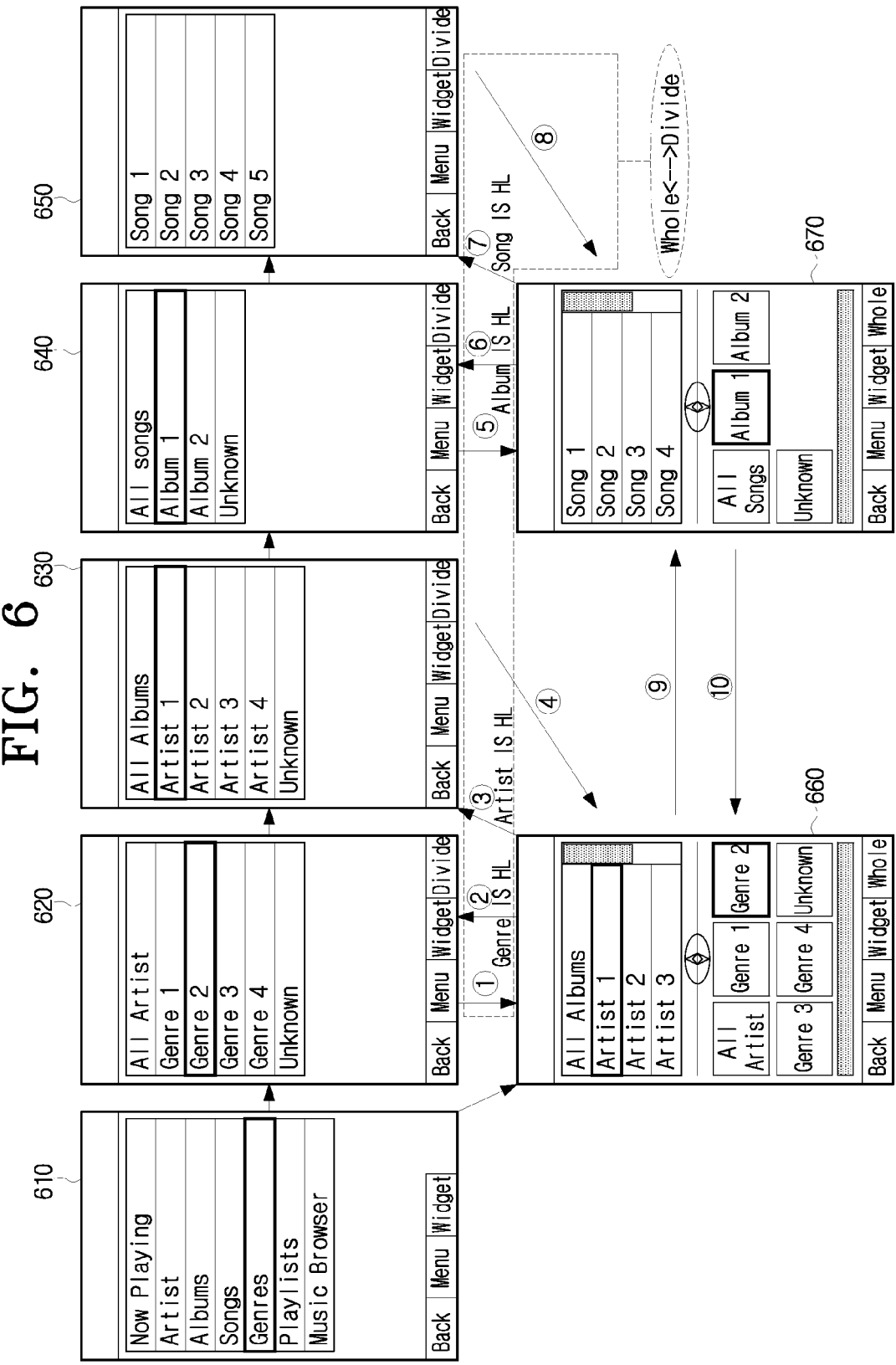
FIG. 6 illustrates a process of sequentially displaying lists according to an example embodiment of the present invention.
Figure 7:
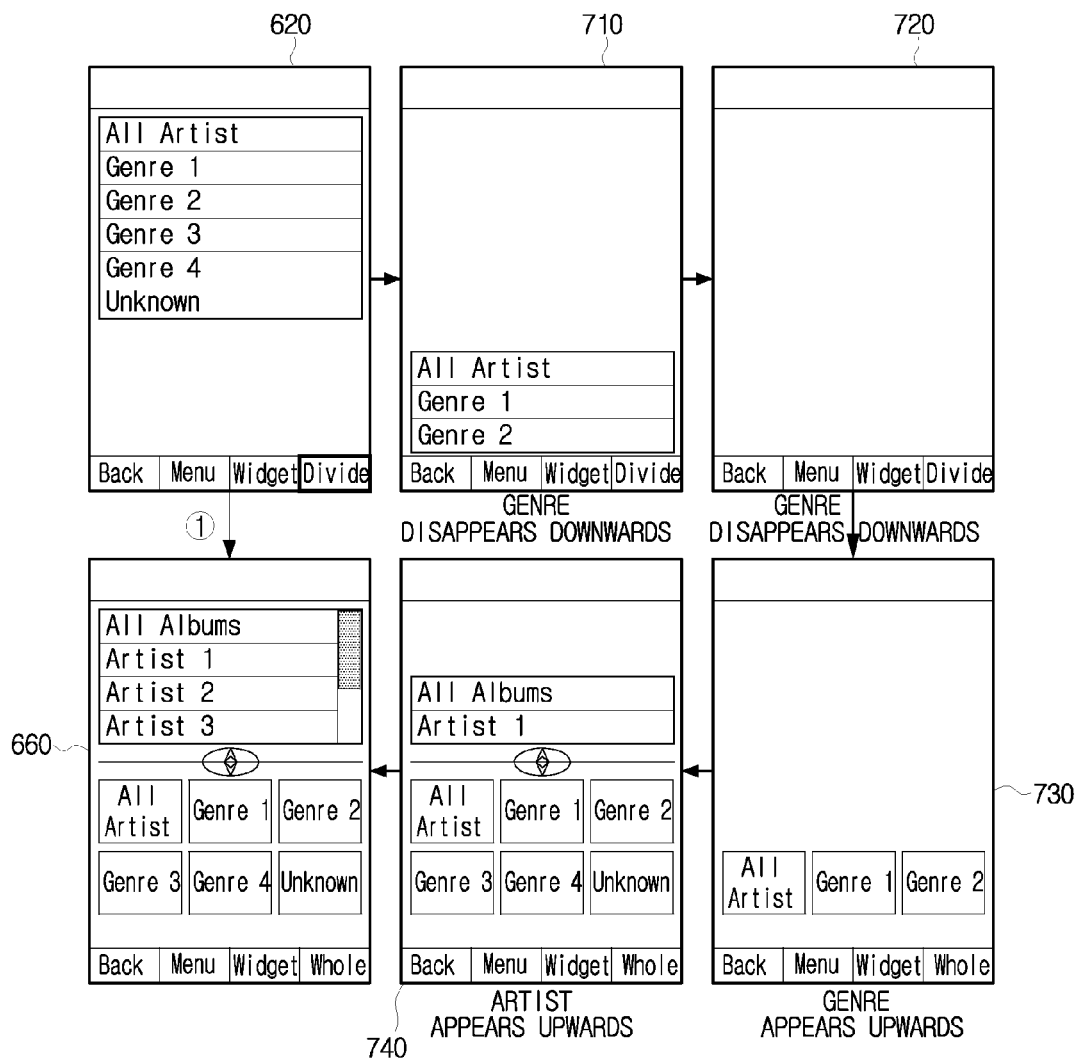
FIG. 7 illustrates graphical effects when a second whole screen 620 in FIG. 6 changes to a first divided screen 660 in FIG. 6 according to an example embodiment of the present invention.
Figure 8:
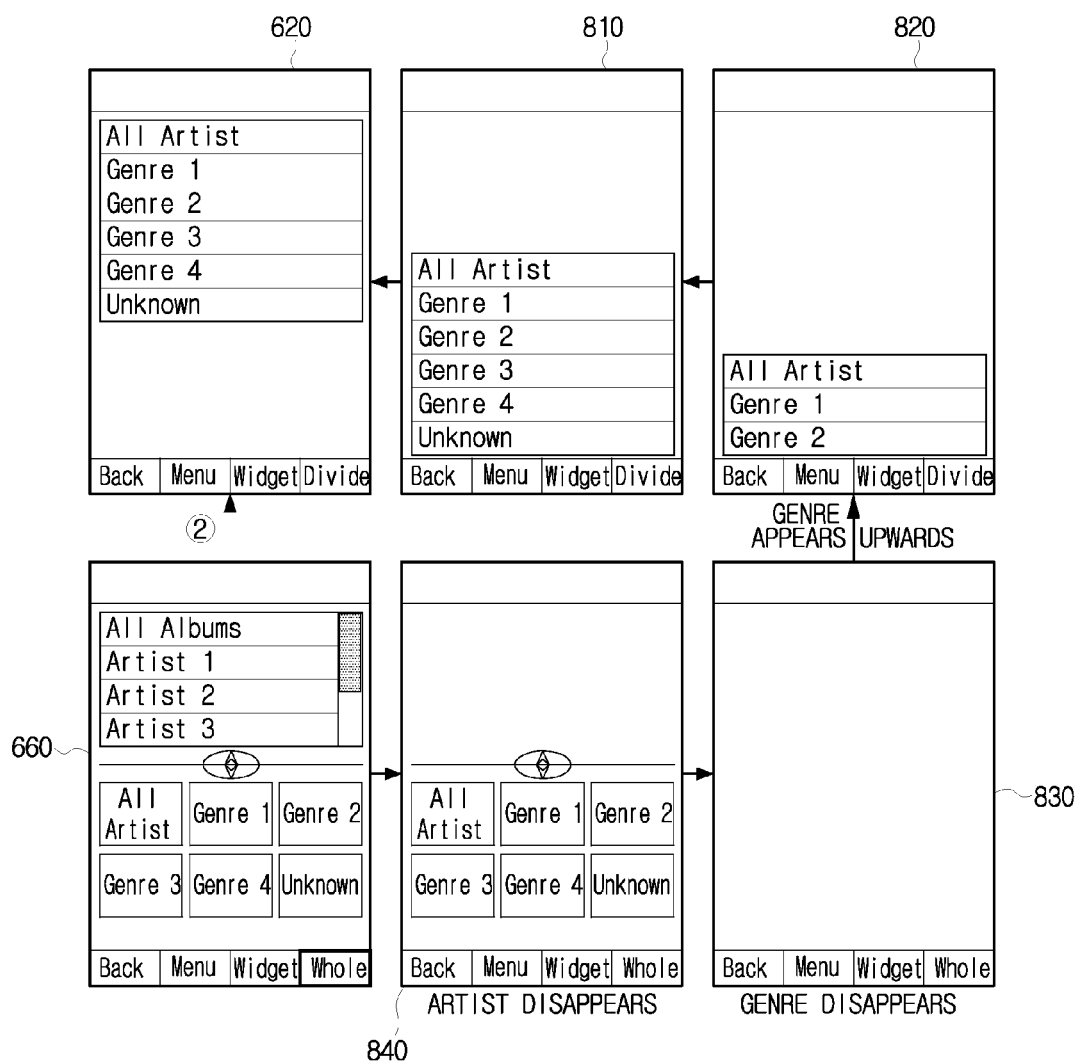
FIG. 8 illustrates graphical effects when a first divided screen 660 in FIG. 6 changes to a second whole screen 620 in FIG. 6 according to an example embodiment of the present invention.

FIG. 8 illustrates graphical effects when the first divided screen 660 in FIG. 6 changes to the second whole screen 620 in FIG. 6 according to an example embodiment of the present invention. Referring to FIG. 8, when the divided screen mode changes to the whole screen mode, the screen changes in the following order: the first divided screen 660→screen 840→screen 830→screen 730→screen 820→screen 810→the second whole screen 620.

Figure 9:
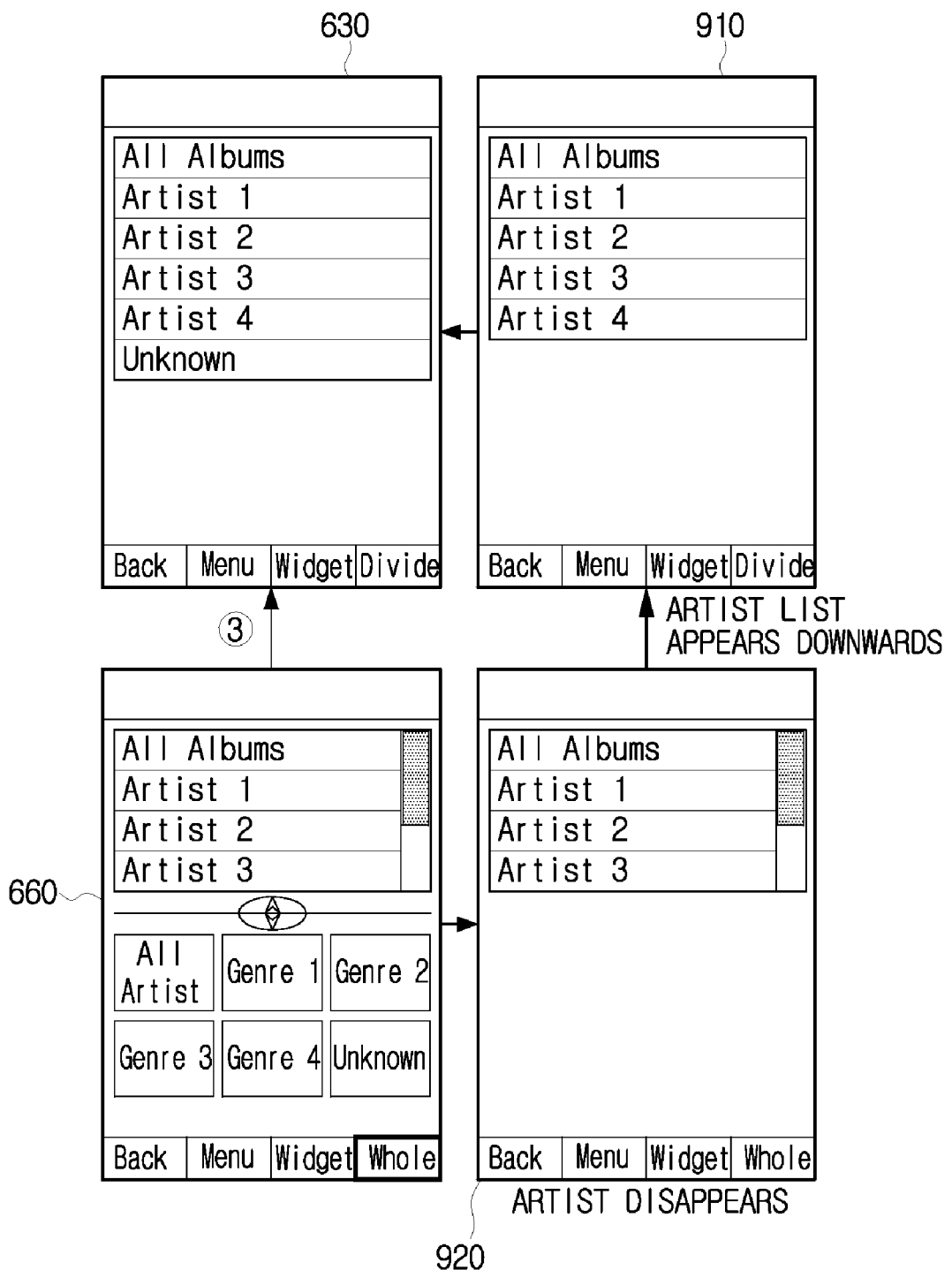
FIG. 9 illustrates graphical effects when a first divided screen 660 in FIG. 6 changes to a third whole screen 630 in FIG. 6 according to an example embodiment of the present invention.

FIG. 9 illustrates graphical effects when the first divided screen 660 in FIG. 6 changes to the third whole screen 630 in FIG. 6 according to an example embodiment of the present invention. Referring to FIG. 9, when the divided screen mode changes to the whole screen mode, the screen changes in the following order: the first divided screen 660→screen 920→screen 910→screen 920→screen 910→the third whole screen 630.

Figure 10:
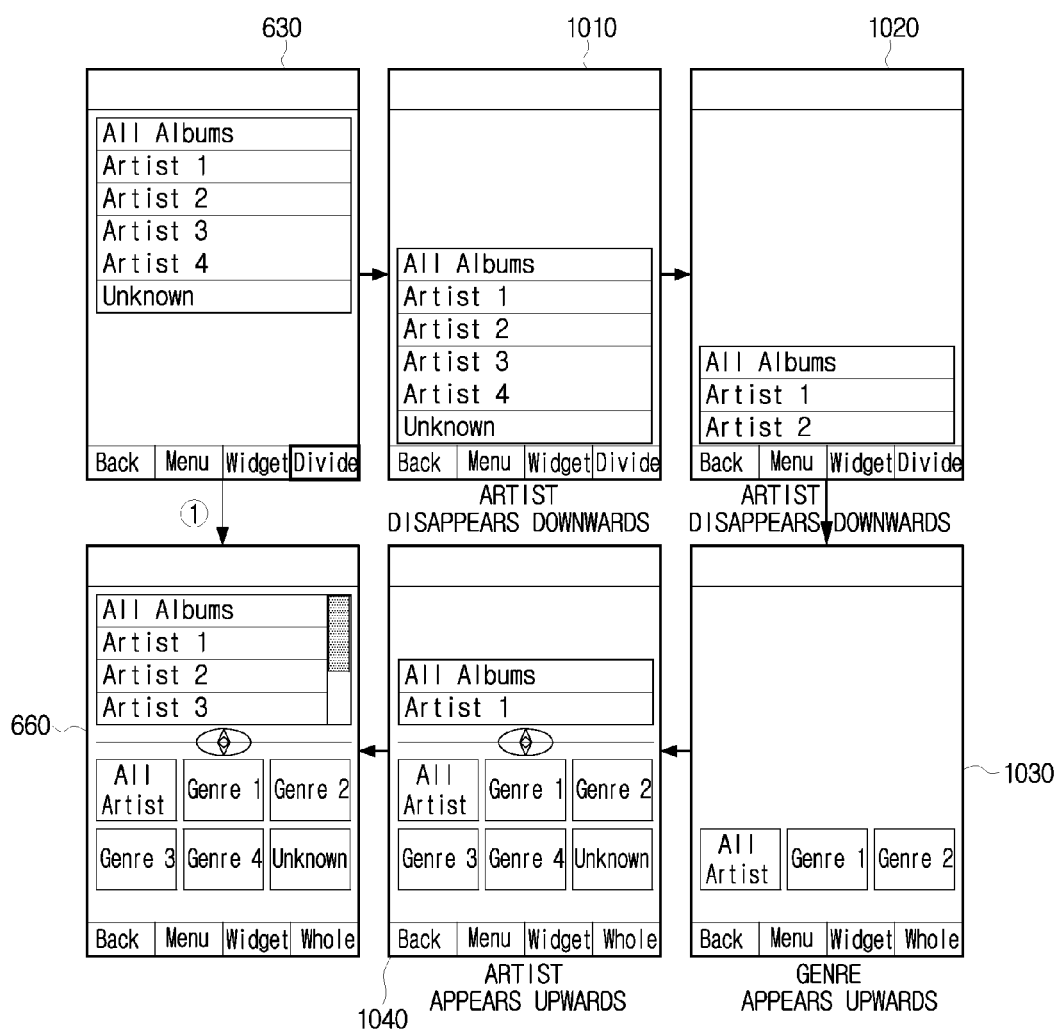
FIG. 10 illustrates graphical effects when a third whole screen 630 in FIG. 6 changes to a first divided screen 660 in FIG. 6 according to an example embodiment of the present invention.

FIG. 10 illustrates graphical effects when the third whole screen 630 in FIG. 6 changes to the first divided screen 660 in FIG. 6 according to an example embodiment of the present invention. Referring to FIG. 10, when the whole screen mode changes to the divided screen mode, the screen changes in the following order: the third whole screen 630→screen 1010→screen 1020→screen 1030→screen 1040→the first divided screen 660.

Figure 11:
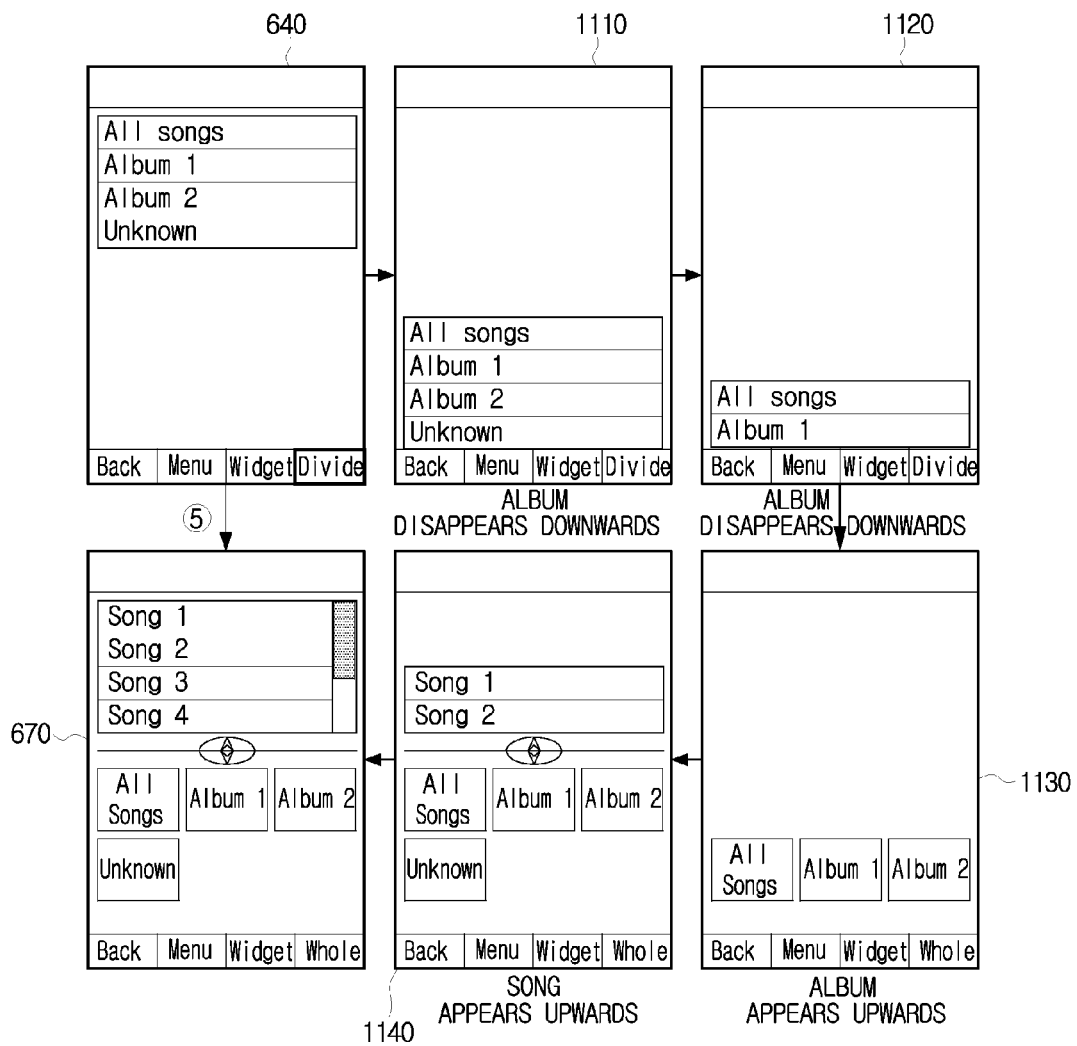
FIG. 11 illustrates graphical effects when a fourth whole screen 640 in FIG. 6 changes to a second divided screen 670 in FIG. 6 according to an example embodiment of the present invention.

FIG. 11 illustrates graphical effects when the fourth whole screen 640 in FIG. 6 changes to the second divided screen 670 in FIG. 6 according to an example embodiment of the present invention. Referring to FIG. 11, when the whole screen mode changes to the divided screen mode, the screen changes in the following order: the fourth whole screen 640→screen 1110→screen 1120→screen 1130→screen 1140→the second divided screen 670.

Figure 12:
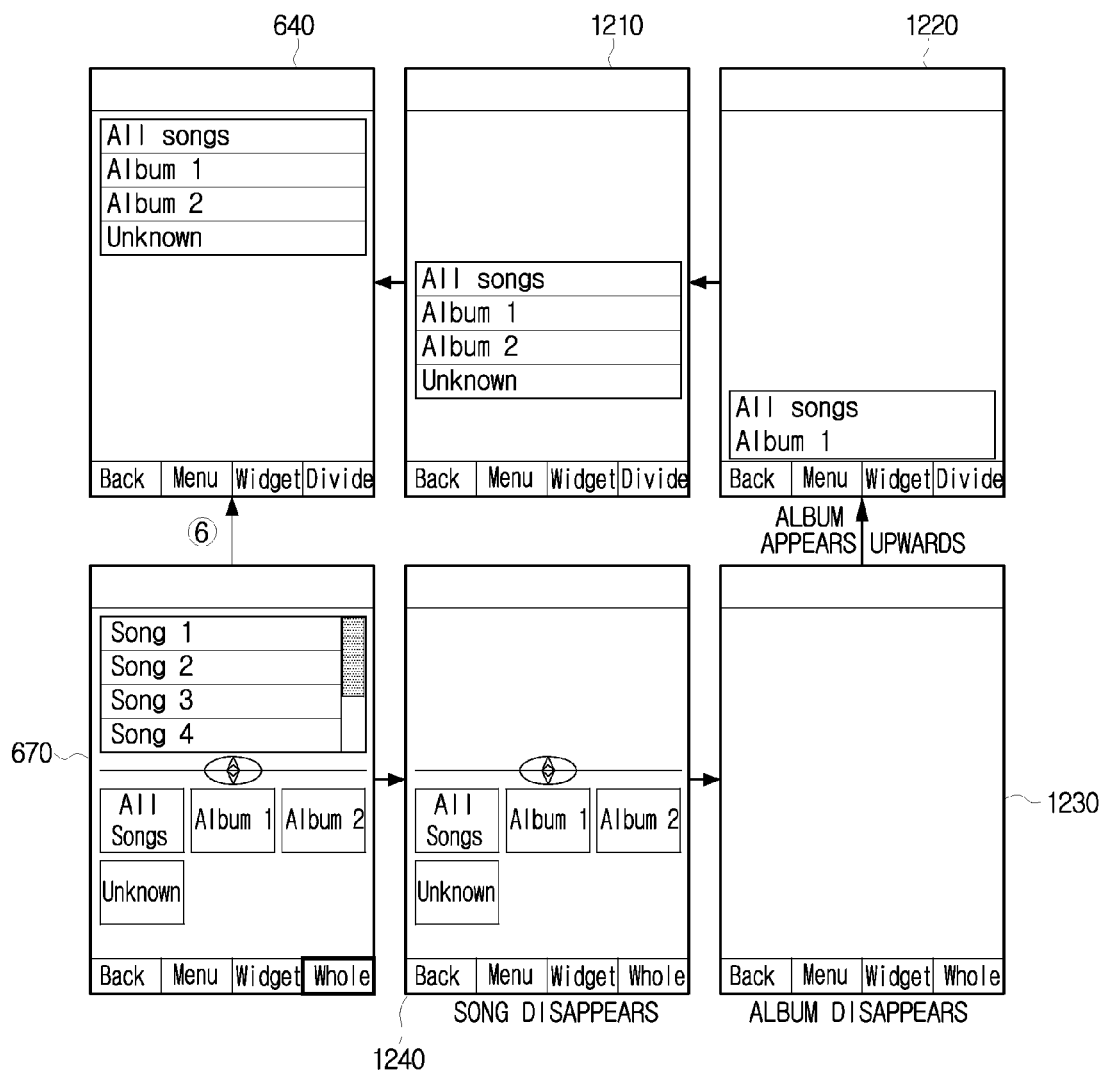
FIG. 12 illustrates graphical effects when a second divided screen 670 in FIG. 6 changes to a fourth whole screen 640 in FIG. 6 according to an example embodiment of the present invention.

FIG. 12 illustrates graphical effects when the second divided screen 670 in FIG. 6 changes to the fourth whole screen 640 in FIG. 6 according to an example embodiment of the present invention. Referring to FIG. 12, when the divided screen mode changes to the whole screen mode, the screen changes in the following order: the second divided screen 670→screen 1240→screen 1230→screen 1220→screen 1210→the fourth whole screen 640.

Figure 13:
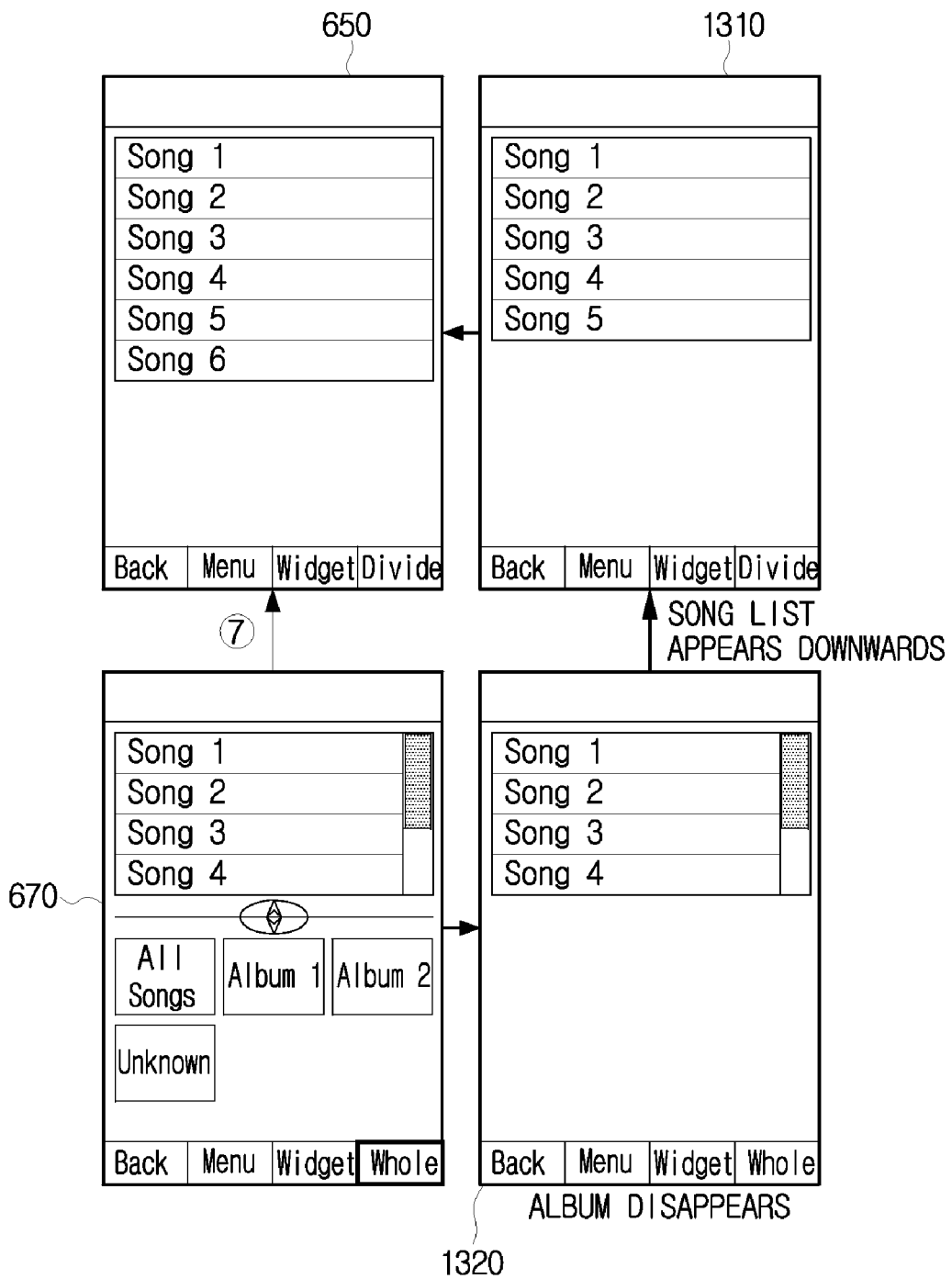
FIG. 13 illustrates graphical effects when a second divided screen 670 in FIG. 6 changes to a fifth whole screen 650 in FIG. 6 according to an example embodiment of the present invention.

FIG. 13 illustrates graphical effects when the second divided screen 670 in FIG. 6 changes to the fifth whole screen 650 in FIG. 6 according to an example embodiment of the present invention. Referring to FIG. 13, when the divided screen mode changes to the whole screen mode, the screen changes in the following order: the second divided screen 670→screen 1320→screen 1310→the fifth whole screen 650.

Figure 14:
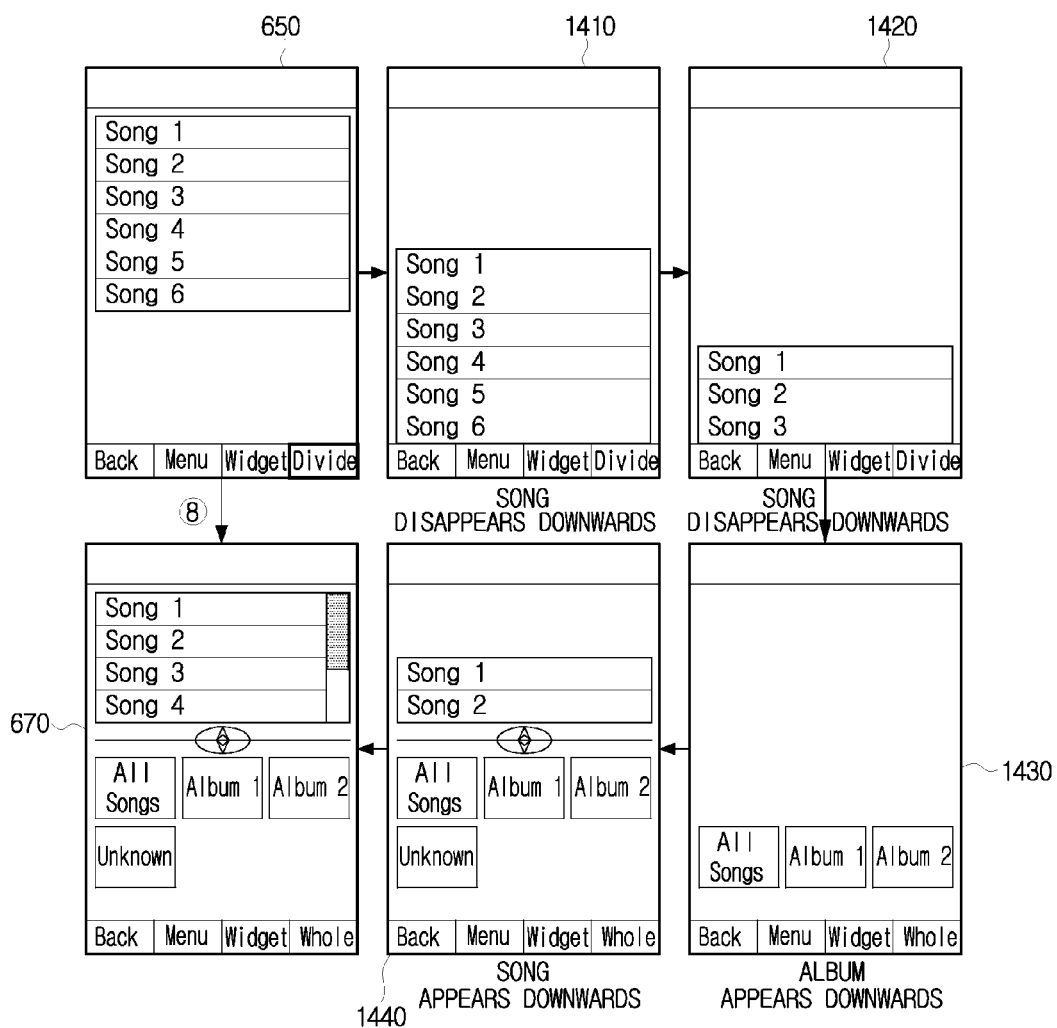
FIG. 14 illustrates graphical effects when a fifth whole screen 650 in FIG. 6 changes to a second divided screen 670 in FIG. 6 according to an example embodiment of the present invention.

FIG. 14 illustrates graphical effects when the fifth whole screen 650 in FIG. 6 changes to the second divided screen 670 in FIG. 6 according to an example embodiment of the present invention. Referring to FIG. 14, when the whole screen mode changes to the divided screen mode, the screen changes in the following order: the fifth whole screen 650→screen 1410→screen 1420→screen 1430→screen 1440→the second divided screen 670.

Figure 15:
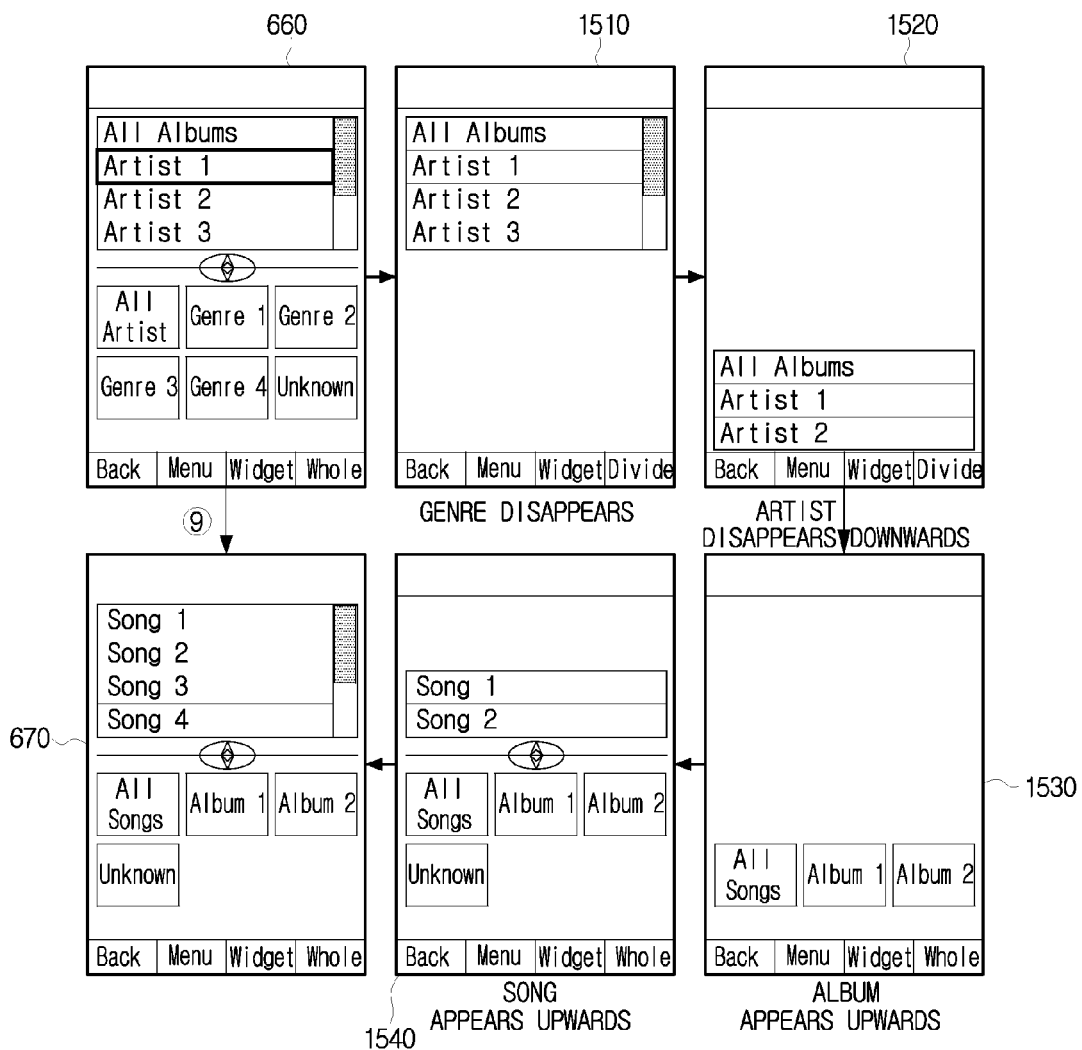
FIG. 15 illustrates graphical effects when a first divided screen 660 in FIG. 6 changes to a second divided screen 670 in FIG. 6 according to an example embodiment of the present invention.

FIG. 15 illustrates graphical effects when the first divided screen 660 in FIG. 6 changes to the second divided screen 670 in FIG. 6 according to an example embodiment of the present invention. Referring to FIG. 15, if the user touches the "artist 1" button on the first divided screen 660, the screen changes in the following order: the first divided screen 660→screen 1510→screen 1520→screen 1530→screen 1540→the second divided screen 670.

Figure 16:
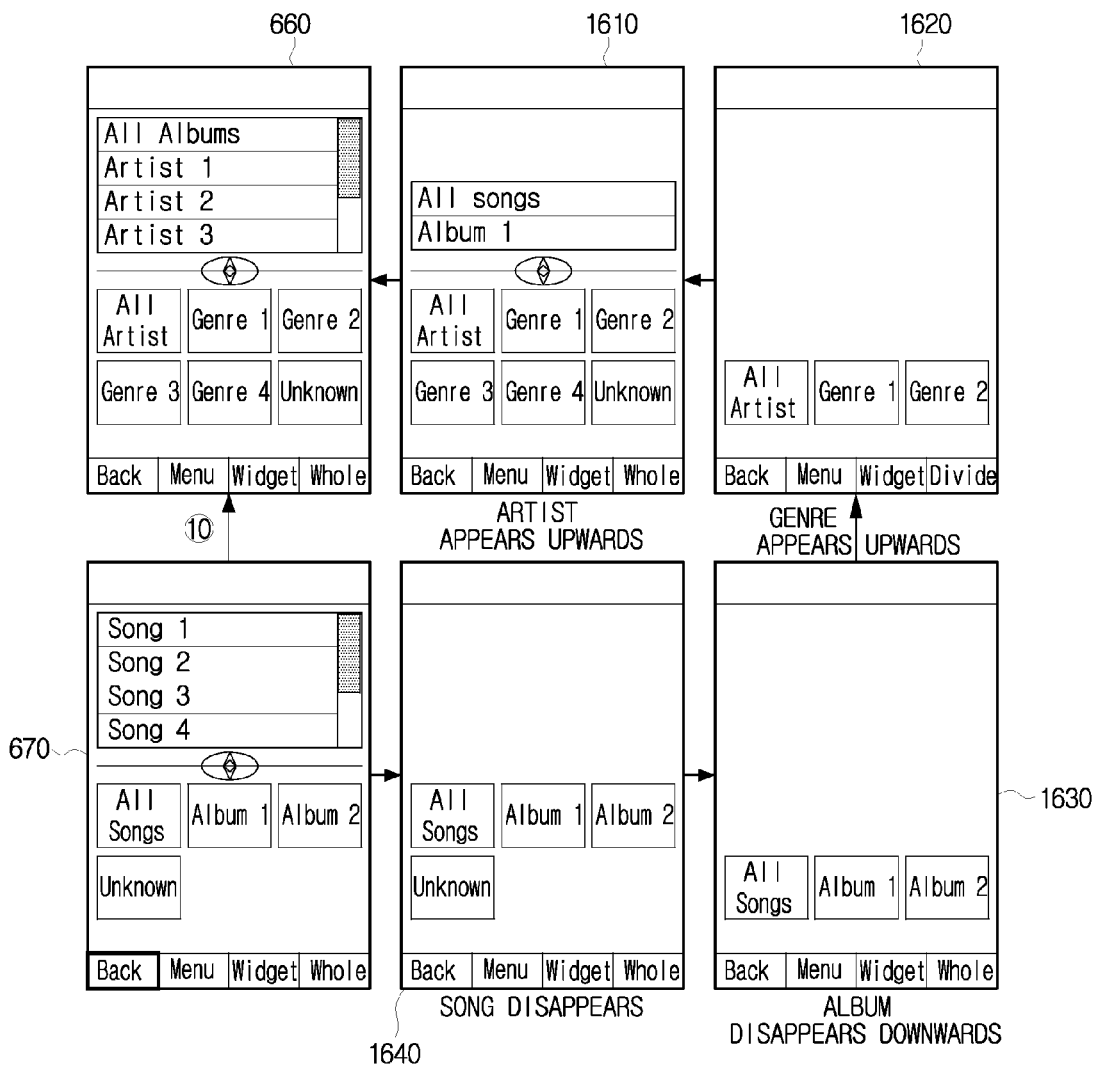
FIG. 16 illustrates graphical effects when a second divided screen 670 in FIG. 6 changes to a first divided screen 660 in FIG. 6 according to an example embodiment of the present invention.

FIG. 16 illustrates graphical effects when the second divided screen 670 in FIG. 6 changes to the first divided screen 660 in FIG. 6 according to an example embodiment of the present invention. Referring to FIG. 16, if the user touches the "back" button on the tool bar of the first divided screen 660, the screen changes in the following order: the second divided screen 670→screen 1640→screen 1630→screen 1620→screen 1610→the first divided screen 660.

As described above, the user can recognize that mode change is being performed by providing graphical effects while changing the list display mode. Though the list display area is divided into two sub-areas in the example embodiments described above, it is understood that the list display area can be divided into more than two sub-areas according to other embodiments. For example, if the list display area is divided into three sub-areas, three lists each are displayed on each sub-area.

Furthermore, though the scroll direction of each list is independently decided according to each area in the example embodiments described above, it is understood that aspects of the present invention can also be applied to any navigation direction of any kinds of navigation manner to search the lists. For example, navigation manners such as performing a search by personally pulling the screen or by rotating the lists can also be applied.

Moreover, it is understood that the multimedia reproducing or management apparatus described above can be an MP3 player, a portable media player (PMP), a cell phone, or a personal digital assistants (PDAs).

As described above, according to aspects of the present invention, a method for providing a GUI to display a plurality of lists in a plurality of divided areas, and a multimedia apparatus using the same are provided, so that the user can search for desired content with greater convenience. In addition, according to aspects of the present invention, a plurality of related lists are respectively displayed on a plurality of divided areas so that the user can confirm and manipulate diverse lists at once. Furthermore, the scroll direction of each list on the plurality of divided areas is independently decided according to the plurality of areas, so the user can scroll each list conveniently and independently.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the list display area can be divided into more than two sub-areas, and more than two lists can be displayed accordingly. Accordingly, it is intended, therefore, that the present invention not be limited to the various example embodiments disclosed, but that the present invention includes all embodiments falling within the scope of the appended claims.

What is claimed is:

1. A method of providing a graphical user interface (GUI) to manage and/or reproduce multimedia content, the method comprising:
   dividing a list display area into a plurality of sub-areas on a display screen;
   displaying a plurality of related lists regarding the multimedia content on the plurality of sub-areas, respectively, on the display screen; and
   independently deciding a navigation direction of each of the plurality of related lists on the plurality of sub-areas according to each respective sub-area,
   wherein the navigation direction of each of the plurality of related lists is respectively decided to be a horizontal direction if a horizontal length of a respective list is greater than a vertical length of the respective list or to be a vertical direction if the vertical length of the respective list is greater than the horizontal length.

2. The method as claimed in claim 1, wherein the displaying of the plurality of related lists comprises:
   displaying a first list on a first sub-area of the plurality of sub-areas; and if an item included on the first list is selected, displaying a second list associated with the selected item on a second sub-area of the plurality of sub-areas.

3. The method as claimed in claim 1, wherein the plurality of related lists have a hierarchical relationship with each other.

4. The method as claimed in claim 1, wherein the displaying of the plurality of related lists comprises:
displaying a first list on a first sub-area of the plurality of sub-areas; and
displaying a second list on a second sub-area of the plurality of sub-areas, the second list being hierarchically lower than the first list.

5. The method as claimed in claim 4, wherein the second list is associated with at least one item included in the first list.

6. The method as claimed in claim 1, wherein the displaying of the plurality of related lists comprises:
displaying a first list in a first display form on a first sub-area of the plurality of sub-areas; and
displaying a second list in a second display form, different from the first display form, on a second sub-area of the plurality of sub-areas.

7. The method as claimed in claim 1, wherein the deciding of the navigation direction comprises deciding the navigation direction of each related list based on a ratio of the horizontal length to the vertical length of each sub-area and/or based on a displaying form of each list.

8. The method as claimed in claim 1, wherein the navigation direction comprises a scroll direction.

9. The method as claimed in claim 1, further comprising changing a position of a border line between the plurality of sub-areas according to a manipulation of a user.

10. The method as claimed in claim 1, further comprising changing a list display mode between a first mode, in which the plurality of related lists are displayed on the plurality of divided sub-areas, and a second mode, in which a first list of the plurality of related lists is displayed on an entire list display area.

11. The method as claimed in claim 10, wherein the changing of the list display mode comprises changing the list display mode according to a manipulation of a user.

12. The method as claimed in claim 10, wherein the changing of the list display mode between the first mode and the second mode comprises changing the list display mode from the second mode to the first mode such that a list that is lastly displayed in the second mode is firstly displayed in the first mode in a sub-area from among the plurality of sub-areas.

13. The method as claimed in claim 1, wherein the plurality of lists comprises a list regarding content, a list regarding categories, and/or a list regarding function menus.

14. The method as claimed in claim 1, wherein the displaying of the plurality of related lists comprises displaying the plurality of related lists on a display area of a portable multimedia reproducing apparatus.

15. A non-transitory computer readable recording medium encoded with the method of claim 1 and implemented by a computer.

16. A multimedia apparatus to manage and/or reproduce multimedia content, the multimedia apparatus comprising:
a display screen to display a Graphical User Interface (GUI) showing the multimedia content;
a generation unit to generate the GUI for a visual display on the display screen; and
a control unit to control the generation unit to divide a list display area into a plurality of sub-areas on the display screen and to generate the GUI such that a plurality of related lists regarding the multimedia content are displayed on the plurality of sub-areas, respectively, of the display screen,
wherein the controller decides a navigation direction of each of the plurality of related lists on the plurality of sub-areas according to each respective sub-area, and
wherein the navigation direction of each of the plurality of related lists is respectively decided to be a horizontal direction if a horizontal length of a respective list is greater than a vertical length of the respective list or to be a vertical direction if the vertical length of the respective list is greater than the horizontal length.

17. The multimedia apparatus as claimed in claim 16, wherein the control unit displays a first list on a first sub-area of the plurality of sub-areas, and if an item included on the first list is selected, displays a second list associated with the selected item on a second sub-area of the plurality of sub-areas.

18. The multimedia apparatus as claimed in claim 16, wherein the plurality of related lists have a hierarchical relationship with each other.

19. The multimedia apparatus as claimed in claim 16, wherein the control unit displays a first list on a first sub-area of the plurality of sub-areas, and displays a second list on a second sub-area of the plurality of sub-areas, the second list being hierarchically lower than the first list.

20. The multimedia apparatus as claimed in claim 19, wherein the second list is associated with at least one item included in the first list.

21. The multimedia apparatus as claimed in claim 16, wherein the control unit displays a first list in a first display form on a first sub-area of the plurality of sub-areas, and displays a second list in a second display form, different from the first display form, on a second sub-area of the plurality of sub-areas.

22. The multimedia apparatus as claimed in claim 16, wherein the control unit independently decides the navigation direction of each related list based on a ratio of the horizontal length to the vertical length of each sub-area and/or based on a displaying form of each list.

23. The multimedia apparatus as claimed in claim 16, wherein the navigation direction comprises a scroll direction.

24. The multimedia apparatus as claimed in claim 16, wherein the control unit changes a position of a border line between the plurality of sub-areas according to a manipulation of a user.

25. The multimedia apparatus as claimed in claim 16, wherein the control unit changes a list display mode between a first mode, in which the plurality of related lists are displayed on the plurality of divided sub-areas, and a second mode, in which a first list of the plurality of related lists is displayed on an entire list display area.

26. The multimedia apparatus as claimed in claim 25, wherein the control unit changes the list display mode according to a manipulation of a user.

27. The multimedia apparatus as claimed in claim 25, wherein when the list display mode changes from the second mode to the first mode, the control unit firstly displays a list that is lastly displayed in the second mode in the first mode in a first sub-area from among the plurality of sub-areas.

28. The multimedia apparatus as claimed in claim 16, wherein the plurality of lists comprises a list regarding content, a list regarding categories, and/or a list regarding function menus.

29. A method of providing a graphical user interface (GUI) to manage and/or reproduce multimedia content, the method comprising:

dividing a list display area into a first area and a second area;

displaying a first list on the first area, and displaying a second list, which is a hierarchically lower list associated with an item included on the first list, on the second area; and independently deciding a navigation direction of each of the first list and the second list respectively on the first area and the second area according to each of the respective ones of the first area and the second area, wherein the navigation direction of each of the first list and the second list is respectively decided to be a horizontal direction if a horizontal length of a respective list is greater than a vertical length of the respective list or to be a vertical direction if the vertical length of the respective list is greater than the horizontal length.

30. The method as claimed in claim 29, further comprising if a user selects an item included on the second list, displaying a third list, which is a hierarchically lower list associated with the selected item, on the first area.

31. The method as claimed in claim 30, further comprising if a user selects an item included on the third list, displaying a fourth list, which is a hierarchically lower list associated with an item included on the third list, on the second area.

32. The method as claimed in claim 29, further comprising if a user selects an item included on the second list, displaying a third list, which is a hierarchically lower list associated with the selected item, on the second area, and displaying the second list on the first area.

33. The method as claimed in claim 29, further comprising if a user selects an item included on the second list, displaying a third list, which is a hierarchically lower list associated with the selected item, on the second area, and displaying a fourth list, which is a hierarchically lower list associated with an item included on the third list, on the first area.

34. A non-transitory computer readable recording medium encoded with the method of claim 29 and implemented by a computer.

35. A method of providing a graphical user interface (GUI) to manage and/or reproduce multimedia content, the method comprising:

dividing a list display area into a first area and a second area on a display screen;

displaying a first list on the first area and a second list on the second area, respectively;

independently deciding a direction for scrolling the first list on the first area according to the first area on the display screen; and independently deciding a direction for scrolling the second list on the second area according to the second area on the display screen, wherein the direction for scrolling the first list and the direction for scrolling the second list are each respectively decided to be a horizontal direction if a horizontal length of a respective list is greater than a vertical length of the respective list or to be a vertical direction if the vertical length of the respective list is greater than the horizontal length.

36. A non-transitory computer readable recording medium encoded with the method of claim 35 and implemented by a computer.

37. A method of providing a graphical user interface (GUI) to manage and/or reproduce multimedia content, the method comprising:

dividing a list display area into a first area and a second area;

displaying a first list in a first display form on the first area, and displaying a second list in a second display form, different from the first display mode, on the second area; and independently deciding a navigation direction of each of the first list and the second list respectively in the first display form and the second display form according to each of the respective ones of the first display form and the second display form, wherein the navigation direction of each of the first list and the second list is respectively decided to be a horizontal direction if a horizontal length of a respective list is greater than a vertical length of the respective list or to be a vertical direction if the vertical length of the respective list is greater than the horizontal length.

38. A non-transitory computer readable recording medium encoded with the method of claim 37 and implemented by a computer.

39. A method of providing a graphical user interface (GUI) to manage and/or reproduce multimedia content, the method comprising:

receiving an input for a first display mode or a second display mode;

in the first display mode, dividing a list display area into a plurality of sub-areas on a display screen, and displaying a plurality of related lists regarding the multimedia content on the plurality of sub-areas, respectively, on the display screen;

in the second display mode, displaying a first list of the plurality of related lists on an entirety of the list display area; and independently deciding a navigation direction of each of the plurality of related lists on the plurality of sub-areas according to each respective sub-area, wherein the navigation direction of each of the plurality of related lists is respectively decided to be a horizontal direction if a horizontal length of a respective list is greater than a vertical length of the respective or to be a vertical direction if the vertical length of the respective list is greater than the horizontal length.

40. A non-transitory computer readable recording medium encoded with the method of claim 39 and implemented by a computer.

\* \* \* \* \*